(12) United States Patent  
Bilowski et al.

(10) Patent No.: US 8,162,729 B2  
(45) Date of Patent: Apr. 24, 2012

(54) METHOD AND APPARATUS FOR PRODUCING SAUSAGES

(75) Inventors: Jörg Bilowski, Delingsdorf (DE); Klaus Hiller, Dörverden (DE); Michael Jeschke, Langwdel-Dörverden (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 21 days.

(21) Appl. No.: 12/836,746

(22) Filed: Jul. 15, 2010

(65) Prior Publication Data

US 2011/0014859 A1    Jan. 20, 2011

(30) Foreign Application Priority Data

Jul. 17, 2009   (DE) .................... 10 2009 033 725

(51) Int. Cl.  
*A22C 11/00*   (2006.01)

(52) U.S. Cl. ........................................................ 452/49

(58) Field of Classification Search .............. 452/21–26, 452/30–32, 35–36, 46–48, 51  
See application file for complete search history.

(56) References Cited

U.S. PATENT DOCUMENTS

| | | | |
|---|---|---|---|
| 4,104,763 A | | 8/1978 | Tetsuro |
| 5,049,108 A | * | 9/1991 | Staudenrausch ................ 452/48 |
| 5,102,368 A | * | 4/1992 | Strasser et al. .................. 452/51 |
| 5,743,792 A | * | 4/1998 | Hanten et al. .................. 452/37 |
| 6,080,054 A | * | 6/2000 | Muller et al. .................... 452/49 |
| 6,231,911 B1 | * | 5/2001 | Steinback et al. ............. 426/518 |
| 6,482,079 B1 | * | 11/2002 | Nakamura et al. .............. 452/47 |
| 7,254,929 B1 | * | 8/2007 | Schutz et al. .................... 53/450 |
| 7,381,123 B2 | * | 6/2008 | Bachtle ............................ 452/46 |
| 7,641,543 B2 | * | 1/2010 | Stimpfl ............................ 452/31 |
| 7,775,861 B2 | * | 8/2010 | Sames ............................. 452/32 |

FOREIGN PATENT DOCUMENTS

DE          4028343 A1       3/1992  
DE     102004056038 A1       5/2006

* cited by examiner

*Primary Examiner* — Richard Price, Jr.  
(74) *Attorney, Agent, or Firm* — Wood, Herron & Evans, LLP

(57) ABSTRACT

A process and an apparatus for producing sausages (28) in which sausage meat is introduced into a tubular case (20) by means of a filling machine (2) and the filled case (20) is divided into portions by means of a twisting-off device (40) for producing twist-off locations (22) so that the result is a sausage chain. The sausage chain is further transported by means of at least two transport devices (6, 8) connected in succession in the sausage chain transport direction (30), and the transport devices (6, 8) can be controlled by means of a control device (38) so that the transport speed of the second transport device (8) in the transport direction is at least at times greater than the transport speed of the first transport device (6).

19 Claims, 3 Drawing Sheets

METHOD AND APPARATUS FOR PRODUCING SAUSAGES

TECHNICAL FIELD

The present invention concerns a process for producing sausages in which sausage meat is introduced by means of a filling machine into a tubular case and the filled case is divided into portions by means of a twisting-off device for producing twist-off locations so that the result is a chain of sausages. The invention further concerns an apparatus for producing sausages comprising a filling machine for introducing sausage meat into a tubular case and a twisting-off device for dividing the filled case into individual portions, with the formation of a twist-off location.

BACKGROUND

Apparatus and process of the aforementioned kind are known for producing sausages in a natural, synthetic or collagen sausage skin. The sausage meat is held in readiness in a filling hopper of a sausage filling machine and introduced into a sausage skin through a filling tube connected to the filling machine. Twist-off locations are produced with a twisting-off device between individual portions of the filled sausage skin so that the result is a chain of individual sausages which however are still interconnected. Then in many situations of use the chain of sausages is fed by means of a transport device to a separating device which severs the chain of sausages in the region of a twist-off location so that individual sausages or a group of interconnected sausages results. The individual sausages or the group are then packaged or subjected to heat treatment.

Particular significance is attributed to transport of the chain of sausages. In regard to separation thereof by means of the separating device it is important for the chain of sausages to be reliably transported away from the twisting-off device and further conveyed to the separating device. Furthermore, in regard to the separation operation, it is important that a twist-off location is of a sufficient length so that the sausages remain reliably closed at their ends after they have been separated.

In addition a particular requirement is for the apparatuses and processes to be such that they can be flexibly adapted to different products or applications. For example adaptation to the respective sausage skin used, that is to say natural, synthetic or collagen skin, or also to different sausage lengths or transverse dimensions is required.

SUMMARY OF THE INVENTION

Having that background in mind, an object of the present invention is to provide a process and an apparatus for producing sausages which permit reliable transport of the chain of sausages. In particular, the invention seeks to provide that the process and the apparatus are suitable for improving transport in regard to separation of the sausage chain into individual sausages. In general terms, another object is to provide a process and an apparatus which can be flexibly adapted to different use parameters.

In a process of the kind set forth in the opening part of this specification, the invention attains that object in that the sausage chain is further transported by means of at least two transport devices connected in succession in the sausage chain transport direction, and the transport devices are so controlled by means of a control device that the transport speed of the second transport device in the transport direction is at least at times greater than the transport speed of the first transport device.

In an apparatus of the kind set forth in the opening part of this specification, the invention further attains the object of the invention by a first transport device which is disposed downstream of the twisting-off device in the transport direction, and a second transport device which is disposed downstream of the first transport device in the transport direction.

In accordance with the invention therefore, it is proposed that two transport devices provide for further transporting the sausage chain provided by the filling machine and the twisting-off device.

That can provide that the sausage chain is transported in portion-wise manner at different speeds. In particular, in the situation where, in accordance with the process, the transport speed of the second transport device is higher than the transport speed of the first transport device, it is possible to achieve an increase in the length of the sausage chain, in particular elongation or stretching of a twist-off location. That provides that on the one hand an individual sausage is subjected to a tensile loading, which can lead to the distribution of the sausage meat being rendered being uniform, and on the other hand, that the twist-off location is elongated or stretched and thereby can be subsequently better separated. Increasing the length of the twist-off location also has the advantage that the sausage ends remain closed more reliably after severing of the twist-off location so that sausage meat does not escape from the sausage skin in unwanted fashion, which would considerably interfere with the procedure. The application of a tensile force by means of the two transport devices operating at different transport speeds further has a positive influence on the accuracy of elongation and an accuracy in terms of transverse dimension of the sausages.

In a preferred embodiment, individual portions of the sausage chain are separated from each other after passing the transport devices by means of a separating device so that individual sausages or groups of sausages are formed. There is thus provided an integrated procedure in which a sausage chain is produced by means of a filling machine and a twist-off device and then the individual sausages can be reliably formed.

In a particularly preferred embodiment, it is proposed that the sausage chain or individual sausages or groups of sausages are further transported by means of a third transport device arranged after the first and second transport devices in the transport direction. Such a third transport device which, viewed in the transport direction, is arranged downstream of the first two transport devices, provides that the individual separated sausages can be defined and reliably transported away downstream of the separating device, for example from a packaging area, a table, a conveyor belt for transporting them away or a suspension device. In particular, the third transport device also provides that the sausage chain stretched by means of the first and second transport devices is held or fixed during the separation operation so that it is possible to produce reliable severing.

In regard to reliable severing, it is proposed that a twist-off location is detected by means of a sensor and the separating device is actuated by means of a signal provided by the sensor and representing a twist-off location in such a way that the separating device severs the sausage chain in the region of a twist-off location. This can involve in particular an optical sensor which reliably detects a twist-off location. In combination with the two transport devices which with suitable control cause elongation of one of the twist-off locations, it is possible to achieve particularly reliable severing and reliable closure of the individual sausages. In addition, the sausage chain is further fixed during the separation operation by the third transport device.

Desirably, the separating device has a separating blade which for severing the sausage chain is moved substantially in an operative direction perpendicularly to the sausage chain transport direction.

A further development of the process according to the invention provides that transport of the sausage chain is effected discontinuously or continuously and the speed of the first, second and/or third transport device can be individually predetermined by means of the control device.

It is particularly preferred if the transport speed of the second transport belt is temporarily increased that a twist-off location is in the region between the first and second transport belts. Then, a higher speed for the second transport belt is briefly and temporarily set by means of the control device. After the elongation operation, the transport speed of the second belt is somewhat reduced again. That therefore affords overall a time-variable, discontinuous process.

In accordance with a further preferred embodiment, it is proposed that the first and/or second and/or third transport device has two mutually spaced movable transport elements, in particular endless belts, which come into contact with the tubular case to transport same.

Overall the invention achieves a large number of advantages and in particular also the following:

It is possible to achieve comparatively long twist-off locations, the ends of the individual sausages remain reliably closed, and reliable separation of even pressure-filled sausages is possible.

BRIEF DESCRIPTION OF THE DRAWINGS

The invention is described in greater detail hereinafter by means of a preferred embodiment by way of example. In the drawings.

DETAILED DESCRIPTION

Figure 1:
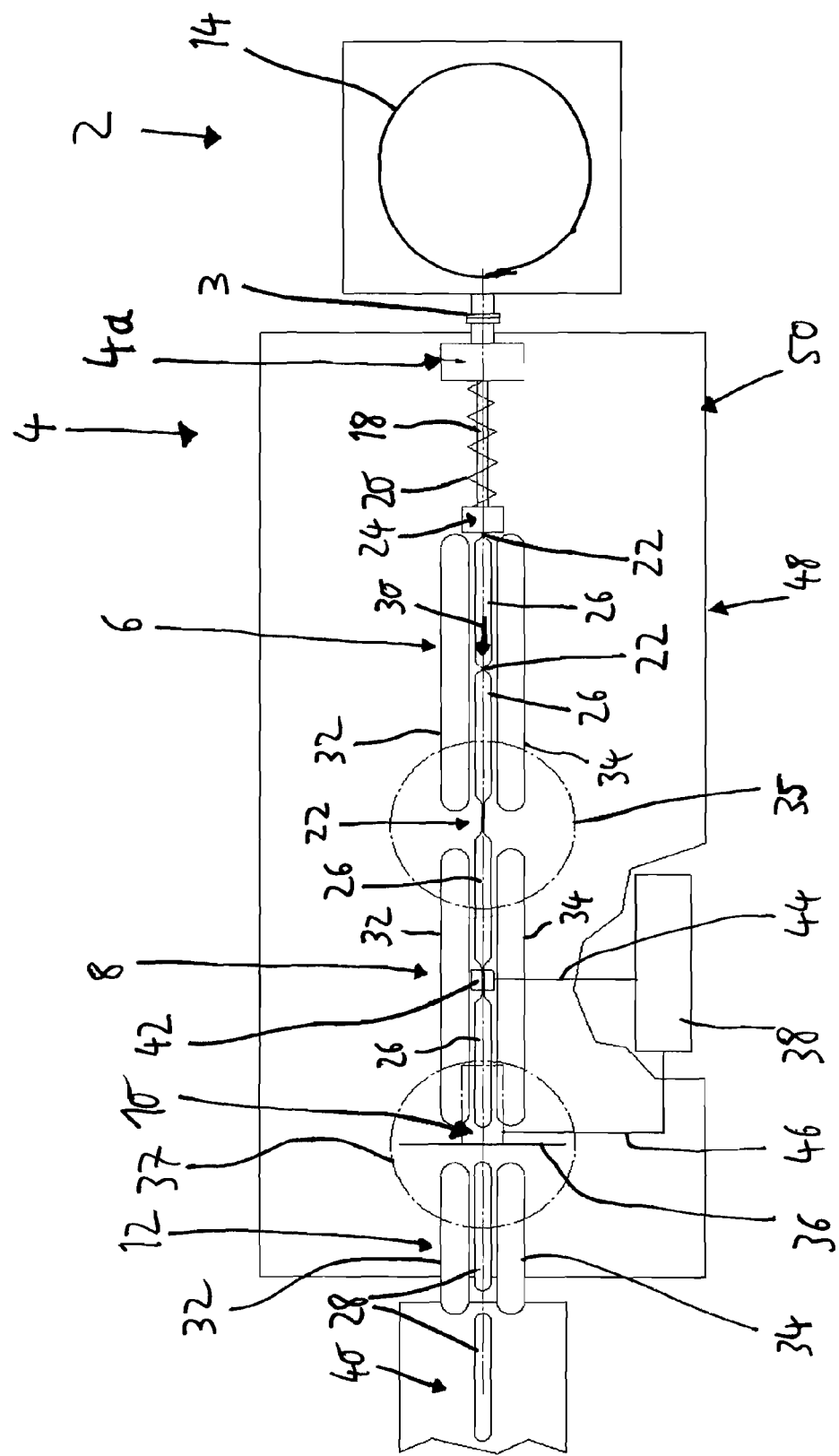
FIG. 1 is a diagrammatic plan view of an apparatus according to the invention for producing sausages and for carrying out a process according to the invention.
Figure 2:
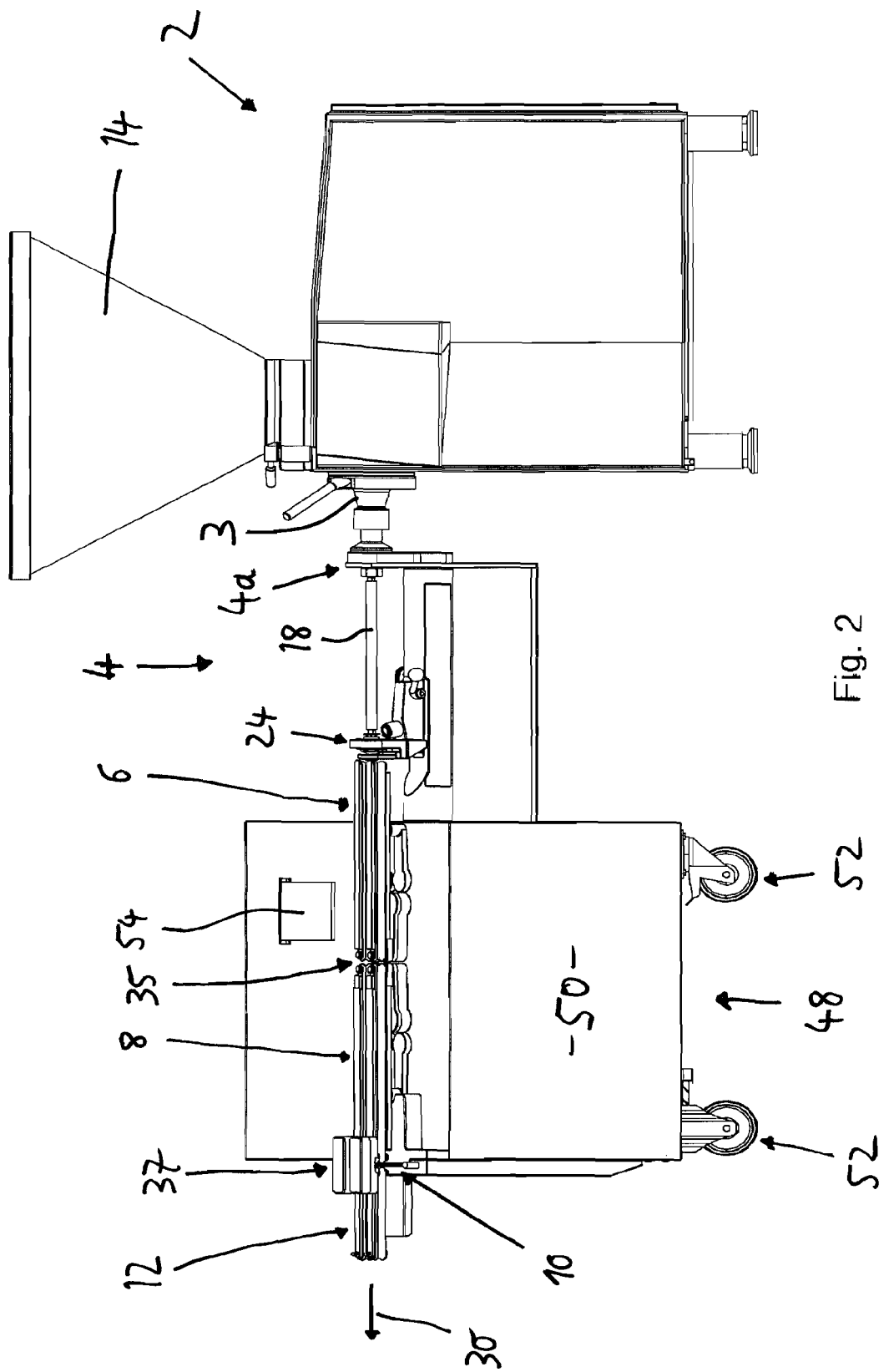
FIG. 2 is a side view of a commercial apparatus in accordance with the diagrammatic view in FIG. 1.
Figure 3:
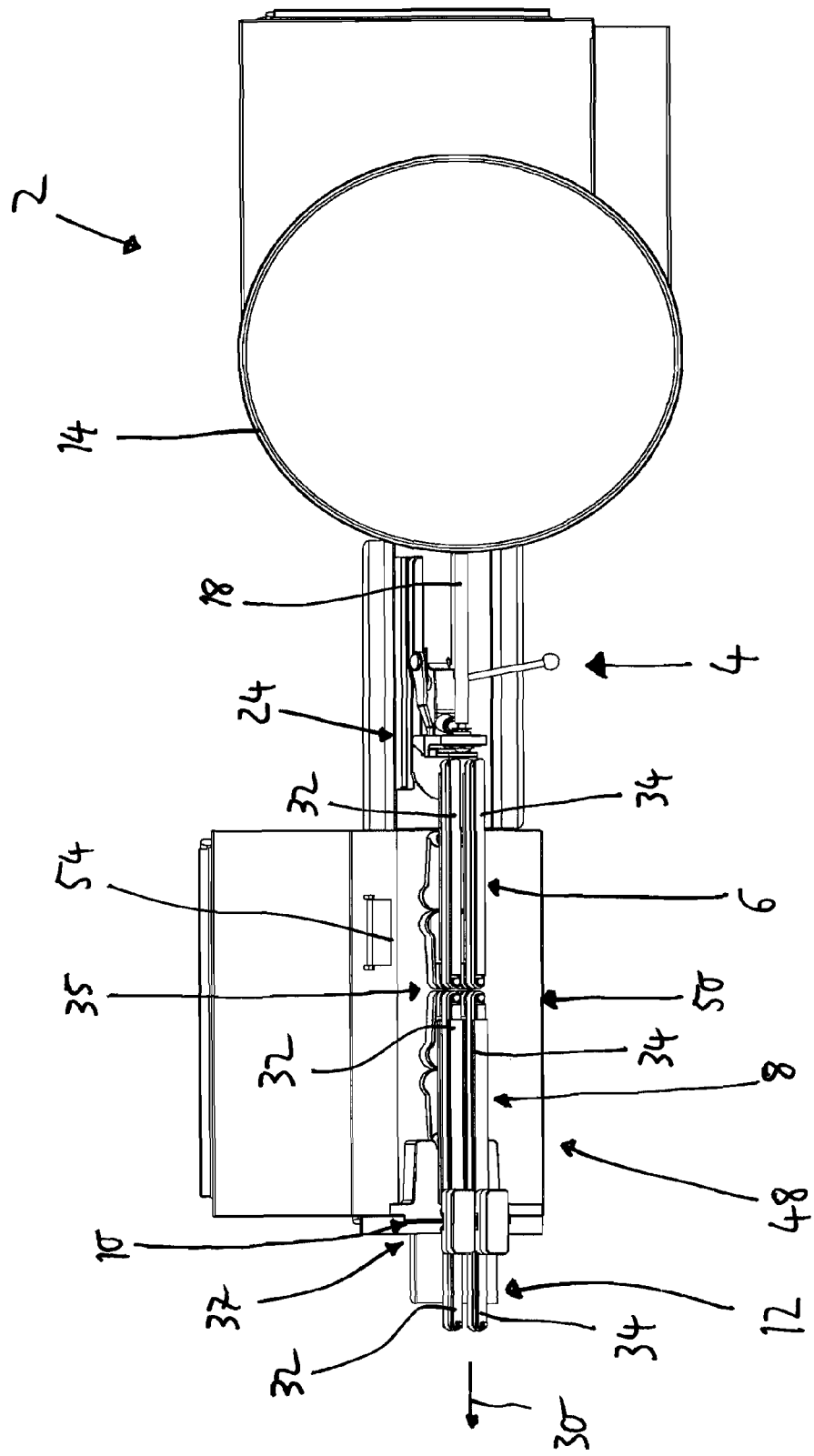
FIG. 3 is a plan view of the apparatus of FIG. 2.

The embodiment shown in FIGS. 1 through 3 of an apparatus for producing sausages is diagrammatically shown in plan in FIG. 1 and is illustrated in FIGS. 2 and 3 by means of a commercial product, wherein hereinafter reference is directed to both forms of representation.

The apparatus has a filling machine 2, a twisting-off device 4 for producing twist-off locations, a first transport device 6, a second transport device 8, a separating device 10 and a third transport device 12.

The per se known filling machine 2 has a filling hopper 14 (FIGS. 2 and 3) for receiving sausage meat, a lifting and tilting device (not shown) for filling the hopper 14 with sausage meat from a sausage meat truck, a filling pump (not shown) for conveying the sausage meat as well as a control device and a filling tube 18 through which sausage meat can be introduced into a tubular case 20 (sausage skin).

The twisting-off device 4 for producing individual twist-off locations 22 (FIG. 1) includes a twisting-off transmission 4a for driving the filling tube 18 in rotation as well as a sausage skin brake 24 in the region of the end of the filling tube 18. During the operation of filling the case 20, a gathered sausage skin which has been previously pulled on to the filling tube 18 is pulled off in known manner through the sausage skin brake 24 and filled with sausage meat issuing from the open end of the filling tube 18. Due to the twisting-off operation, individual portions 26 are produced in the filled sausage skin, and later form the individual sausages 28 (FIG. 1). The individual portions 26 form a sausage chain which is further transported in the transport direction 30 (FIG. 1).

The first transport device 6, the second transport device 8 and the third transport device 12 are disposed, as viewed in the transport direction 30, downstream of the filling machine 2 and the twisting-off device 4, possibly with the interposition of further devices like the separating device 10. In the illustrated embodiment, the first transport device 6 is arranged immediately adjoining the end of the filling tube 18. The first transport device 6 has two mutually spaced transport elements drivable by means of an electric motor (not shown), in the form of endless belts 32, 34. The spacing between the two mutually opposite endless belts 32, 34 can be altered so that it is possible to transport sausages of a different caliber or transverse dimension.

In principle, the second transport device 8 is of the same configuration as the first transport device 6 so that attention is directed in its full extent to the preceding description and the same references have been used for components of the same structure. The second transport device 8 adjoins the first transport device 6 in the transport direction 30. The spacing between the two transport devices 6, 8 can be varied according to the respective situation of use.

The third transport device 12 adjoins the second transport device 8. In principle, the third transport device 12 is of the same configuration as the first transport device 6 so that attention is directed in its full extent to the preceding description and the same references have been used for components of the same structure. The third transport device 12 adjoins the second transport device 8 in the transport direction 30. The spacing between the two transport devices 8, 12 can be varied according to the respective situation of use.

The separating unit 10 with its separating blade 36 is arranged between the second transport device 8 and the third transport device 12. The separating device 10 has an electric motor coupled to a rotatable shaft which is arranged axially with respect to the transport direction 30 and to which a rotatable blade 36 is fixed. The separating blade 36 is arranged in its operative direction and its direction of movement, perpendicularly to the transport direction 30.

A control device 38 is coupled to the transport devices 6, 8, 12 and the separating device 10 so that signals can be transmitted for controlling the drives of the components.

Disposed downstream of the third transport device 12 is a unit 40 for further processing and/or transporting the individual sausages 28 (or groups of sausages) in the transport direction 30. The unit 40 can be for example a table, a transport belt or a suspension device or a packaging machine for packaging the individual sausages 28.

A sensor 42 (FIG. 1) for detecting a twist-off location 22 is arranged adjacent to the path of movement of the sausage chain and is in particular in the form of an optical sensor. The sensor 42 produces a signal which represents the presence of a twist-off location 22 and which can be transmitted to the control device 38 by means of a signal line 44. The signal is processed by the control device 38 and a further signal is generated, which is transmitted to the separating device 10 by means of the signal line 46 to actuate the drive motor of the separating device 10 and to switch it on so that the separating blade 36 severs the twist-off location 22 as centrally as possible so as to result in the individual sausages 28 (or groups of sausages).

As in particular FIGS. 1 and 2 show the first, second and third transport devices 6, 8, 12, the separating device 10 and the control device 38, together with signal lines, are mounted to a displaceable support structure in the form of a carriage or truck 48 which has a frame structure 50 and a plurality of wheels 52. The control device 38 can be operated by means of an operating panel 54. The transport devices 6, 8, 12 and the separating device 10 can be arranged adjustably in height by means of a lift device so that they can be adapted to the height of the filling tube 18.

The mode of operation and the process according to the invention for producing sausages as well as further details of the apparatus according to the invention are described hereinafter with reference to the Figures:

The filling machine 2 conveys sausage meat through connecting portions 3 into the filling tube 10. The sausage meat is introduced into the case 20 through the open end of the filling tube 18. In the region of the sausage skin brake 24, a respective twist-off location 22 is produced by means of the twisting-off device 4. The individual portions 26 of the sausage chain are engaged by the first transport device 6, more accurately the endless belts 32, 34 thereof, and further transported in the transport direction (arrow 30 in FIG. 1). At the same time the portions 26 of the sausage chain are prevented from also turning by the contact of the endless belts 32, 34 with the sausage chain.

In the transfer region 35, the sausage chain is transferred to the second transport device 8 and engaged by the endless belts 32, 34 thereof and further transported in the transport direction 30. The transport speed of the second transport device 8 is increased at least at times, when the twist-off location 22 is in the region 35, so that it is higher than the transport speed of the first transport device 6. By virtue of the relative speed produced thereby, that is to say the difference in the transport speed of the second transport device and the transport speed of the first transport device 6, the twist-off location 22 is elongated or stretched in the region 35 (FIG. 1). The relative speed is adapted to the respective situation of use. The apparatus is so operated by means of the control device 38 that the second transport device 8, more precisely the drive motor thereof, is accelerated at least at times, while the first transport device 6 is operated at a constant transport speed.

The sausage chain is further transported by the second transport device 8 and a twist-off location 22 which has been previously stretched passes into the region of the sensor 42 so that, while the—stretched—twist-off location 22 is passing, it outputs a signal through the signal line 44 to the control device 38. The control device 38 processes the signal, having regard to the transport speeds and the spacing between the sensor 42 and the separating blade 36 of the separating device 10, in such a way that a signal is delivered by the control device 38 through the signal line 46 to the drive of the separating device 10 so that the separating blade 36 approximately centrally severs the twist-off location 32 in the separating region 37. That thus results in individual sausages 28 or interconnected groups of sausages 28, depending on how the control device 38 has been programmed. The cut can be particularly reliably effected because the sausages are additionally held by the third transport device 12 during the separation operation.

Sausages 28 then pass into the region of the third transport device 12 which engages the sausages 28 and further transports them in the transport direction 30 towards the unit 40, for example a table or a suspension device or the like. The third transport device 12 can also be actuated by the control device 38 by means of a signal line (not shown). The speed is adjustable. The relative speeds in relation to the transport devices 6 and 8 are also adjustable and variable.

The first, second and/or third transport device 6, 8, 12 can be operated at a constant speed or also at a time-variable transport speed.

A series of modifications to the process according to the invention and the apparatus are conceivable. Thus, for example, instead of a control device 38 it is also possible to use the control device of the filling machine 2 to actuate the transport device 6 and/or the transport device 8 and/or the transport device 12 and/or the separating device 10 or to process signals of the sensor 42. In that case, corresponding signal lines are passed to the control device of the filling machine 2.

Instead of the endless belts 32, 34, it is also possible to use other transport elements, for example rotating wheels or vane-type transport elements which come into engagement with the sausage chain.

The invention claimed is:

1. A process for producing sausages, the process comprising:
    introducing sausage meat into a tubular case using a filling machine;
    dividing the filled case into portions using a twisting-off device to produce a sausage chain with twist-off locations;
    transporting the sausage chain with at least two transport devices connected in succession in the sausage chain transport direction; and
    controlling the transport devices such that a transport speed of the second transport device in the transport direction is at least at times greater than a transport speed of the first transport device in the transport direction.

2. The process of claim 1 wherein the relative transport speed between the first and second transport devices in the transport direction is so adjusted that one of the twist-off location between two portions of the filled tubular case is elongated.

3. The process of claim 1 further comprising:
    after the sausage chain passes the transport devices, separating individual portions of the sausage chain from each other using a separating device so that individual sausages or groups of sausages are formed.

4. The process of claim 3 further comprising:
    detecting a twist-off location with a sensor; and
    actuating the separating device in response to a signal provided by the sensor such that the separating device severs the sausage chain near one of the twist-off locations.

5. The process of claim 3 further comprising:
    moving a separating blade of the separating device substantially in an operative direction perpendicularly to the transport direction of the sausage chain to sever the sausage chain.

6. The process of claim 1 wherein the sausage chain, individual sausages, or groups of sausages are further transported and/or are held by a third transport device arranged in the transport direction after the first and second transport devices.

7. The process of claim 1 wherein transport of the sausage chain is effected discontinuously or continuously, and the speed of the first transport device and/or the second transport device can be individually predetermined.

8. The process of claim 7 wherein the relative speeds of the first and/or second transport devices can be so predetermined that each is variable in respect of time.

9. An apparatus for producing sausages, comprising:
a filling machine configured to introduce sausage meat into a tubular case;
a twisting-off device configured to form twist-off locations that divided the filled case into individual portions;
a first transport device disposed downstream of the twisting-off device in the transport direction;
a second transport device disposed downstream of the first transport device in the transport direction; and
a control device cooperating with the first and second transport devices such that the transport speed of the second transport device is at least at times greater than the transport speed of the first transport device.

10. The apparatus of claim 9 wherein the control device sets the relative speed between the first and second transport devices such that a twist-off location between two portions of the filled tubular case can be elongated.

11. The apparatus of claim 10 further comprising:
a separating device coupled with the control device and arranged downstream of the first and second transport devices in the transport direction; and
a sensor coupled with the control device and arranged adjacent to the path of movement of the tubular case, the sensor configured to detect each of the twist-off locations between two portions.

12. The apparatus of claim 9 further comprising:
a third transport device downstream of the first and second transport devices in the transport direction.

13. The apparatus of claim 12 further comprising:
a separating device downstream of the first and second transport devices in the transport direction.

14. The apparatus of claim 13 wherein the separating device is arranged upstream of the third transport device in the transport direction.

15. The apparatus of claim 13 wherein the separating device has a separating blade movable substantially in an operative direction perpendicularly to the sausage chain transport direction.

16. The apparatus of claim 12 further comprising:
a control device configured to actuate the third transport device.

17. The apparatus of claim 9 wherein the first transport device and/or second transport device has a pair of mutually-spaced movable transport elements that contact with the tubular case to transport the tubular case.

18. The apparatus of claim 17 wherein each of the mutually-spaced movable transport elements is an endless belt.

19. The apparatus of claim 9 wherein the first transport device and/or the second transport device is configured to operate at an adjustable speed.

* * * * *

UNITED STATES PATENT AND TRADEMARK OFFICE
CERTIFICATE OF CORRECTION

PATENT NO. : 8,162,729 B2  
APPLICATION NO. : 12/836746  
DATED : April 24, 2012  
INVENTOR(S) : Jörg Bilowski et al.

Page 1 of 1

It is certified that error appears in the above-identified patent and that said Letters Patent is hereby corrected as shown below:

On the Title Page

In the first column, (75) Inventors, change "Langwdel" to --Langwedel--.

In the Specification

At Column 3, Line number 23, change "device has" to --devices have--.

In the Claims

At Column 6, Claim number 2, Line number 39, change "location" to --locations--.

At Column 6, Claim number 5, Line number 55, change "severe" to --sever--.

At Column 7, Claim number 9, Line number 5, change "divided" to --divide--.

At Column 8, Claim number 17, Line number 17, change "has" to --have--.

At Column 8, Claim number 19, Line number 23, change "is" to --are--.

Signed and Sealed this  
Sixteenth Day of January, 2018

Joseph Matal  
*Performing the Functions and Duties of the*  
*Under Secretary of Commerce for Intellectual Property and*  
*Director of the United States Patent and Trademark Office*